United States Patent [19]

Versteegh

[11] Patent Number: 5,648,246

[45] Date of Patent: Jul. 15, 1997

[54] PROCESS FOR THE CONTINUOUS PREPARATION OF WORT

[75] Inventor: Christiaan Willem Versteegh, Delft, Netherlands

[73] Assignee: Heineken Technical Services B.V., Amsterdam, Netherlands

[21] Appl. No.: 447,741

[22] Filed: May 23, 1995

Related U.S. Application Data

[62] Division of Ser. No. 90,066, Sep. 3, 1993, Pat. No. 5,536,650, which is a continuation of PCT/NL92/00006, Jan. 1, 1992.

[30] Foreign Application Priority Data

Jan. 11, 1991 [NL] Netherlands .......................... 9100050

[51] Int. Cl.$^6$ ............................... C12C 1/00; C12P 1/00
[52] U.S. Cl. ...................... 435/93; 424/94.1; 426/11; 426/16; 426/28; 426/29; 426/30; 435/41
[58] Field of Search .................... 424/94.1; 426/11, 426/28, 29, 16, 30, 41; 435/93, 302, 303

[56] References Cited

U.S. PATENT DOCUMENTS

| | | | |
|---|---|---|---|
| 2,127,759 | 8/1938 | Silhavy | 99/52 |
| 2,309,989 | 2/1943 | Saltzman | 99/278 |
| 3,048,489 | 8/1962 | Blum | 99/81 |
| 3,216,345 | 11/1965 | Rigby et al. | 99/276 |
| 3,891,781 | 6/1975 | Bauer et al. | 426/429 |
| 3,989,848 | 11/1976 | Moll et al. | 426/30 |
| 4,285,975 | 8/1981 | Glenister | 426/29 |
| 4,409,246 | 10/1983 | Stewart et al. | 426/16 |
| 4,622,224 | 11/1986 | Owades | 426/16 |
| 4,844,932 | 7/1989 | Daoud | 426/489 |
| 4,861,608 | 8/1989 | Versteegh | 426/489 |
| 4,995,979 | 2/1991 | Versteegh | 210/521 |
| 5,453,285 | 9/1995 | Versteegh | 426/29 |
| 5,536,650 | 7/1996 | Versteegh | 435/93 |

FOREIGN PATENT DOCUMENTS

| | | |
|---|---|---|
| 0265152 | 4/1988 | European Pat. Off. . |
| 1222454 | 8/1966 | Germany . |

OTHER PUBLICATIONS

Article—"Determination of the Filterability of Wort and Beer", Nov. 1984, pp. 175–176 Brauweit Int'l.
Kirk-Othmer, Encyclopedia of Chemical Tech., 3rd Ed., vol. 9, 1980, pp. 696–703.
McGraw-Hill Dictionary of Scientific and Technical Terms, Daniel N. Lapedes, Editor in Chief, 1974, p. 338.
Webster's Third New Int'l. Dictionary, Philip Babcock Gove, Editor in Chief, G. & C. Merriam Co., 1966, p. 519.
Kirk-Othmer Concise Encyc. of Chemical Tech., John Wiley & Sons, Inc., 1985, pp. 578–580.

*Primary Examiner*—John W. Rollins
*Assistant Examiner*—Deborah K. Ware
*Attorney, Agent, or Firm*—Pearne, Gordon, McCoy & Granger LLP

[57] ABSTRACT

This invention relates to a process for the continuous preparation of wort, including the continuous enzymatic conversion of malt in one rotating disc contactor and separation of spent grain from mash in a separation unit. Further, a process for the continuous preparation of wort, including the continuous gelatinization and enzymatic liquefaction of a mixture based on unmalted grain, malt and/or an enzyme source and water in a rotating disc contactor, addition of malt and/or enzyme source to the product obtained, enzymatic conversion of the product obtained and separation of the spent grain from the mash in a separation unit.

19 Claims, 2 Drawing Sheets

PROCESS FOR THE CONTINUOUS PREPARATION OF WORT

This is a division of application Ser. No. 08/090,066, filed Sep. 3, 1993, now U.S. Pat. No. 5,536,650, which is a continuation of PCT/NL92/00006, Jan. 1, 1992.

BACKGROUND OF THE INVENTION

This invention relates to a process for the continuous preparation of wort, comprising the continuous enzymatic conversion of malt to a mash. Moreover, the invention is concerned with the continuous gelatinization and enzymatic liquefaction of a mixture based on unmalted grain, an enzyme source and water. The invention also relates to a continuous process for the preparation of wort, comprising the above steps followed by a continuous separation of the spent grain from the mash.

DESCRIPTION OF THE RELATED ART

When making beverages from cereals, more in particular when brewing beer, wort is used. A conventional preparation of wort occurs by mixing the starting materials, e.g., comprising unmalted grain (maize) and water. The solid materials are first crushed (pulverized) and then mixed with the water. The resulting suspension is kept for some time at a temperature of at least 40° C. in the presence of an enzyme source, e.g., malt. Gelatinization and liquefaction thereby occur. In a next step the enzymatic conversion of the mixture (mash) is continued after supplementary addition of malt and/or an external enzyme source.

It is also possible to prepare wort on the basis of malt and water. Then the first step is omitted.

The product thus obtained consists mainly of water, insoluble components of the raw materials, as well as soluble components thereof, such as fermentable and unfermentable sugars and proteins. In the conventional method this mixture is filtered to remove the insoluble components, the spent grain. The filtrate or extract is the wort. For brewing beer, hops is then added to the wort, which is boiled. The flakes formed, if any, are removed, and the wort is cooled to about 8° C. and fermented.

In the past much research was done into the continuous performance of the steps of gelatinization, liquefaction and conversion to fermentable and unfermentable sugars. In particular, research was done into the performance of these steps in an envelope heat exchanger (Food Engineering Int'l. December 1976, pp. 22–27). This research, however, did not result in a commercial use.

The object of this invention is to provide a method for the continuous preparation of wort, in which no problems occur with respect to contamination and the like, and which has the additional advantage that there are no or substantially no restrictions relative to the particle size of the raw materials to be used.

SUMMARY OF THE INVENTION

The invention therefore relates to a process for the continuous preparation of wort, comprising the continuous enzymatic conversion of malt in a rotating disc contactor and separation of spent grain from mash in a separation unit. The invention also relates to such a process comprising the continuous gelatinization and enzymatic liquefaction of a mixture based on unmalted grain, an enzyme source and water in a rotating disc contactor, addition of malt and/or an enzyme source to the resulting product, enzymatic conversion of that product and separation of the spent grain from the mash in a separation unit.

Preferably, the enzymatic conversion is carried out continuously in a rotating disc contactor.

It is possible to carry out the process in one or more rotating disc contactors. The number of contactors partly depends on the nature of the raw materials to be used.

DETAILED DESCRIPTION OF THE PREFERRED EMBODIMENTS OF THE INVENTION

When unmalted grain is used, two reaction steps are carried out, in the first of which the pulverized material is gelatinized and liquefied under the influence of an enzyme system. This enzyme system often originates from malt. In a second step malt and/or an additional enzyme system is added, and further reaction occurs. It is thus necessary to carry out two reaction steps, which may be done advantageously in two reactors, although it is also possible to use one reactor, on condition that it is provided with inlets in the proper places. When only malt is used, without unmalted grain, it is sufficient to carry out only the second reaction step, which may be done in one reactor.

Surprisingly, it has been found that it is possible with the process according to the invention to prepare wort without the occurrence of the problems that are inherent to the known continuous wort preparation methods.

The solid components, such as malt and unmalted grain, used according to the invention are first pulverized, e.g., in a hammer mill, to a particle size which can pass through screens with a mesh size of from 5 μm to 5 mm.

The pulverized solid materials are mixed with the water and fed to the reactor or reactors. When unmalted grain is used, a temperature ranging from 40° to 100° C. is maintained in a first reaction step. Gelatinization and liquefaction under the influence of the enzyme system present thereby occur. In the second reaction step malt and/or the enzyme source and water are added, together with the product obtained in the first reaction step. In this reaction step enzymatic conversion occurs. The temperature in this reaction step generally ranges from 30° to 80° C. When no unmalted grain is used, this is the only reaction step, and a mixture of malt and water is fed to this reaction step.

According to the invention a rotating disc contactor is used, which is a known type of column reactor as described in, e.g., Kirk-Othmer, Encyclopedia of Chemical Technology, Third Edition, Vol. 9, page 702.

Such a reactor generally consists of a column provided with a central agitator shaft having attached thereto 10 or more discs or plates. These discs or plates cover at least 80% of the cross section of the column. In general, this surface does not exceed 95%. By rotating the shaft and the discs in the column a proper dispersion of the solid matter in the liquid takes place.

In connection with the desired possibility to clean the column a system is preferably used in which the shaft can be easily removed, e.g., due to the absence of baffles in the column.

The use of a rotating disc contactor has the surprising advantage that the particle size of the raw materials can be adjusted almost independently of the apparatus used. In combination with the use of a continuous wort filtration this means that the particle size of the starting materials can be chosen almost freely, so that this particle size can be adjusted optimally, independently of the nature of the process apparatus.

The separation of the spent grain from the mash can be carried out in different ways. It is possible, e.g., to carry out a conventional wort-filtration. This is in particular a possibility in the situation that an existing brewhouse is to be extended. By simply adding a rotating disc contactor in combination with a buffer vessel the capacity and effectiveness of a brewhouse can be considerably increased. In that case the enzymatic conversion preferably also occurs in a conventional noncontinuous manner.

The advantages of the process according to the invention can be better utilized, however, if the wort filtration is also carried out continuously, e.g., using a combination of mixers and settling units. Preferred is the use of a membrane filtration unit, since this results in an optimum effect in the continuity of the process and the efficiency of the wort preparation.

A preferred embodiment of the process according to the invention is characterized in that the spent grain is separated from the mash in at least one membrane filtration unit, if desired followed by addition of hops to the wort and boiling of the wort.

The membrane filtration is effected by using at least one membrane filter, but preferably by using a multi-stage filter, e.g., a multi-stage counterflow filtering apparatus, such as a three-stage apparatus or a multi-stage cross-flow filtering apparatus. The membranes in the membrane filter have a pore size not exceeding 2.0 µm, preferably ranging from 0.1 to 1.5 µm. Such a pore size results in an optimum activity of the filtration unit, because at this pore size a good clear wort is obtained with a high extract yield. The membrane filter also has a good self-cleaning effect. The material of the membrane is not very critical. Of special importance is the mechanical stability at the temperature of the wort to be filtered. In addition, the material must be suitable for use in contact with foods. Particularly suitable are membranes on the basis of ceramic materials.

It is to be noted that European patent application 0 265 152 discloses the filtration of wort using a membrane having a pore diameter of from 10.0 to 100.0 µm. As appears from the text of that publication, the membrane is intended to separate the spent grain from the mash, the advantage residing in that a smaller particle size of the starting products can thus be used. This has advantages relative to the extraction efficiency of the sugars from the raw materials.

However, the membrane filtration according to this publication does not result in a clear wort which is simply adapted for further use. In particular, it appears from the text of the application that the wort as initially produced is not free from suspended particles, so that a supplementary filtration is required. This is a drawback of this method.

When using a membrane having a pore size within the limits according to the present invention the extract yield is better than when using a membrane having larger pores. Moreover, less fouling of the membrane occurs. The latter has the advantage that the process can be carried out continuously, since much less cleaning of the membranes is required.

The wort obtained with the process according to the invention has a clarity measured as European Brewing Convention (EBC) units at 65° C. of from 0.25 to 5. The clear wort is mixed with hops, and the mixture is boiled. Flocculation of material, such as proteins and polyphenols, may then occur. If desired, this flocculated material may be removed, e.g., in a separator. After cooling the wort to a temperature ranging from 2° to 25° C., preferably to about 8° C., the wort can be fermented to beer.

The boiling of the wort preferably occurs continuously, with recovery of at least part of the heat. Apparatuses suitable therefor are known from the literature. These apparatuses may be based, e.g., on multi-effect evaporators with a heat exchange of the spent gases with the liquid to be boiled. The heat can be advantageously used in the gelatinization, liquefaction and/or enzymatic conversion.

The cooled wort can be fermented, optionally after residence in a buffer vessel. The invention therefore also relates to a process for brewing beer using wort prepared as described above.

A surprising aspect of the process according to the invention resides in the fact that the particle size of the solid materials only slightly effects the activity of the filters, contrary to what is suggested in the cited European patent application.

The invention will now be illustrated with reference to the accompanying drawings, which shows an example of a process scheme according to a preferred embodiment of the invention, as well as an embodiment of two membrane filtration systems.

Figure 1:
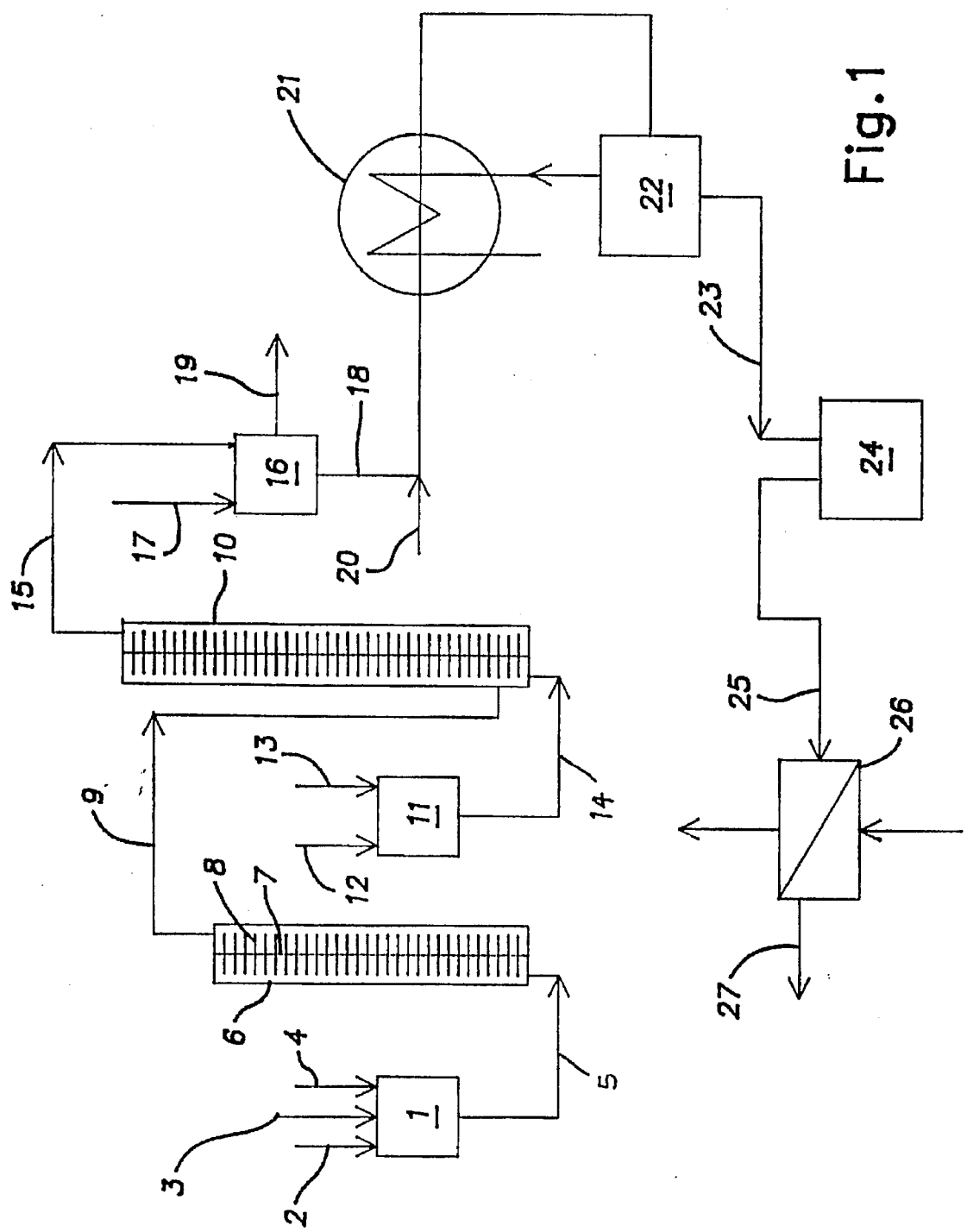
FIG. 1 shows a process scheme of a preferred embodiment of the process according to the invention.

The process scheme of FIG. 1 shows a mixer 1, to which water having a temperature of about 55° C., pulverized unmalted grain and pulverized malt are passed through lines 2, 3 and 4, respectively. After mixing, the mixture is passed through line 5 to the first rotating disc contactor 6, which comprises an agitator shaft 7 provided with discs 8. The reactor 6 is provided with heating elements, not shown, with which the reactor contents can be adjusted to and maintained at the desired temperature.

The product from the reactor 6 is passed through line 9 to the rotating disc contactor 10. Water of about 55° C. and pulverized malt are passed through lines 12 and 13 to a mixer 11. The resulting mixture is passed through line 14 to the bottom of the column 10 where it is mixed after some residence time with the product from the reactor 6. Through a line 15 the resulting mash is passed to a membrane filtration 16, to which, in addition, water is passed through a line 17. Through a line 18 the resulting clear wort obtained is discharged from the membrane filtration unit. The spent grain is discharged through a line 19.

The clear wort is mixed with hops supplied through a line 20. The mixture of wort and hops is fed to a heat exchanger 21, in which it is preheated with heat from the boiling step. The preheated wort is fed to the wort boiler 22, in which it is boiled for some time. The boiled product is passed through a line 23 to the separator 24, in which flocculated materials, such as proteins and polyphenols, are separated. The clear boiled wort then passes through a line 25 into a cooler 26, in which it is cooled. Through a line 27 the wort can be discharged, e.g., to a fermentation.

Figure 2:
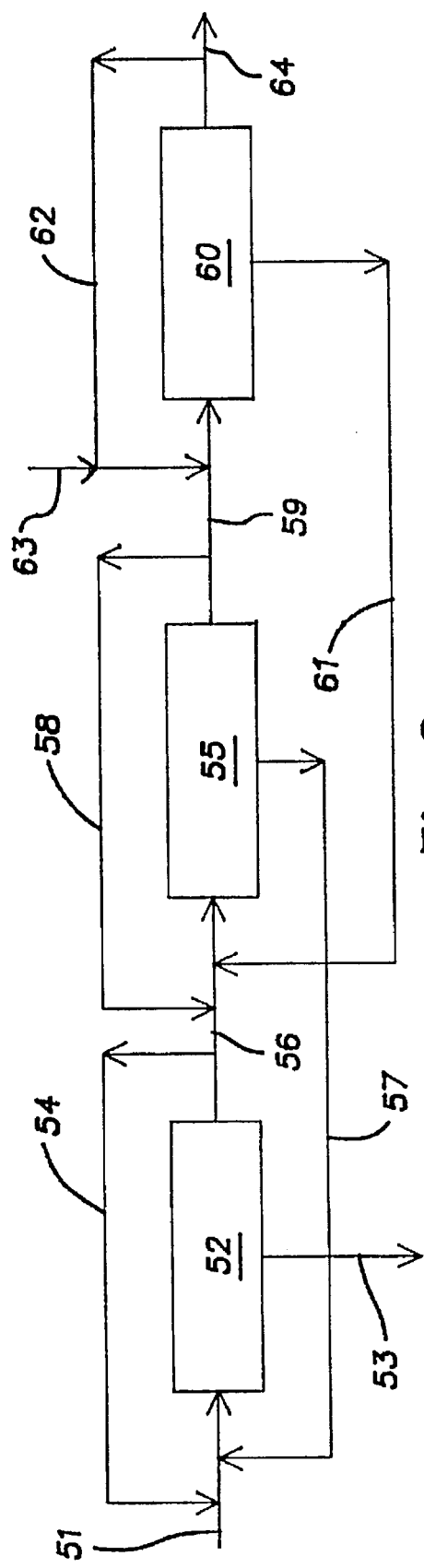
FIG. 2 shows a detailed embodiment of the three-stage counterflow membrane filtration unit.

FIG. 2 shows a possible arrangement of a three-stage counterflow membrane filtration unit.

In this Figure, the mash is passed through a line 51 to the first membrane filter 52, from which the clear wort is discharged through a line 53. Part of the retentate of the filter 52 is returned through a line 54 to the feed end of the filter, together with the permeate of the second membrane filter 55. The rest of the retentate is passed through a line 56 to the second membrane filter 55. The permeate of this membrane is returned through a line 57 to the first membrane filter. The retentate of the second filter 55 is partly returned to the feed end of the second membrane filter 55, through a line 58, while the rest is passed through a line 59 to the third membrane filter 60. The permeate of this third membrane filter 60 is returned through a line 61 to the feed end of the second membrane filter 55. Part of the retentate of the third filter 60 is returned through a line 62 to the feed end of the third filter 60, together with water passed through a line 63. The rest of the retentate, the spent grain, is discharged through a line 64.

The description of this system is based on a three-stage filtration unit, but it is of course possible to adapt the number of stages as required, using the same principle.

Figure 3:
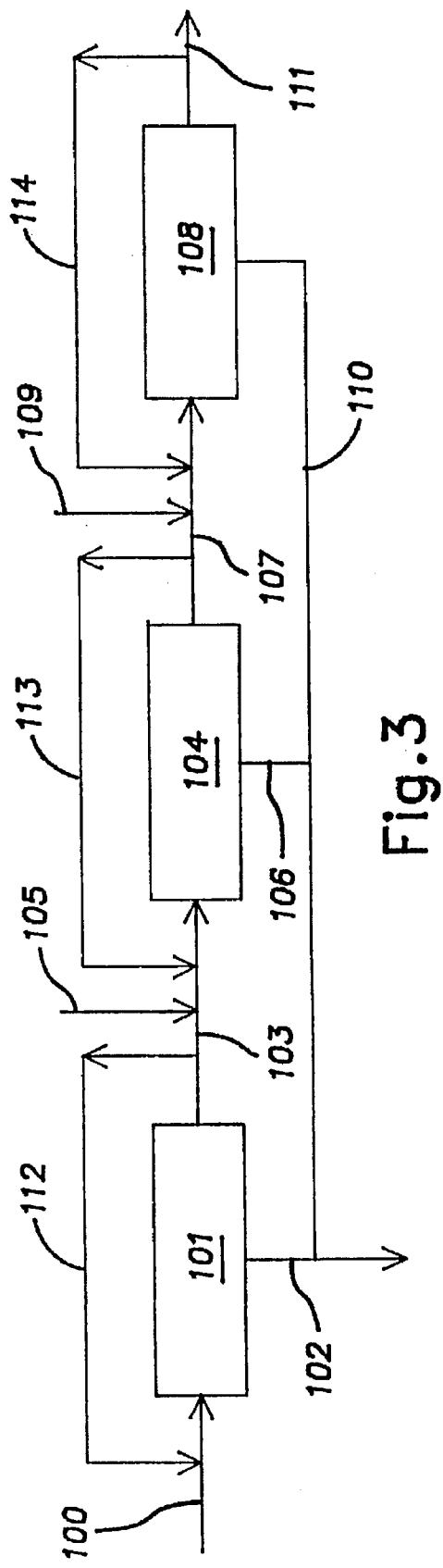
FIG. 3 shows an embodiment of a cross-flow membrane filtration unit.

FIG. 3 shows an embodiment of a cross-flow filtration unit, on the basis of a three-stage equipment, but the number of stages can be adapted as required, using the same principle.

In FIG. 3, the mash is passed through a line 100 to the first membrane filter 101, from which the clear wort is discharged through a line 102. The retentate of the filter 101 is partly passed through a line 103 to the second membrane filter 104 and partly returned through a line 112 to the feed end of the filter 101. Through a line 105 water is passed to the feed end of the filter 104. The permeate of the membrane filter 104 is discharged through a line 106 and combined with the permeate of the first membrane filter 101. The retentate of the second filter 104 is partly passed through a line 107 to the third membrane filter 108, together with water supplied through a line 109, and partly returned through a line 113 to the feed end of the filter 104. The permeate of this third membrane filter 108 is combined through a line 110 with the permeate of the first two filters. The rest of the retentate, the spent grain, is partly discharged through a line 111 and partly returned through a line 114 to the feed end of the filter 108.

The invention will be further illustrated by an Example, but is not limited thereto.

EXAMPLE

To the mixer 1 of an apparatus, as shown in FIG. 1 are added per hour 5 kg maize, 2.5 kg malt and 22.5 l water having a temperature of 55° C. The maize and the malt were pulverized in a hammer mill to a particle size that can pass through a 1.5 mm screen. The mixture had a temperature of 50° C. The mixture was passed to a rotating disc contactor, in which the temperature was increased to 95° C. The total residence time of the mixture at 50° C. was 5 min., while the residence time at 95° C. was 10 to 15 min.

To the mixture 11 were added per hour 15 kg malt of the same particle size and 45 l water having a temperature of 55° C. The mixture obtained therein had a temperature of 50° C. and was passed to the bottom of the second rotating disc contactor.

The product from the first rotating disc contactor was passed to the second rotating disc contactor at such a level that the residence time of the malt/water mixture was about 15 min. at 50° C. By admixing the hot product the temperature increased to 65° C. This temperature was maintained for 30 min., after which it was raised to 76° C., which temperature was maintained for another 5 min.

After this treatment a mash was obtained having an extract content of about 21.5%, which was passed to the membrane filtration unit 16. This unit was as shown in FIG. 2. The membrane filtration using membranes having a pore size of 0.4 µm gave a wort having a clarity of 0.3 EBC units (at 65° C.). After mixing with hops, boiling, separating flakes formed and cooling, a cold wort having a temperature of 8° C. was obtained, which could be fermented to beer.

What is claimed is:

1. A process for the continuous preparation of wort, comprising providing a mixture to a rotating disc contractor, said rotating disc contactor comprising a column provided with a central agitator shaft having discs attached thereto, said mixture comprising water and one or more materials in a first group consisting of unmalted grain, malt, and an enzyme source other than malt, continuously gelatinizing and enzymatically liquefying said mixture in said rotating disc contactor to yield a first product, adding one or more materials in a second group consisting of malt and an enzyme source other than malt to said first product to yield a second product, enzymatically converting said second product, and separating spent grain from mash in a separation unit to provide wort, said materials in said first group and said materials in said second group being capable of passing through screens with a mesh size of from 5 µm to 5 mm.

2. A process as claimed in claim 1, wherein said step of enzymatically converting said second product is carried out continuously in a rotating disc contactor comprising a column provided with a central agitator shaft having discs attached thereto.

3. A process as claimed in claim 1, wherein said separating step is carried out in a membrane filtration unit having a filter pore size not exceeding 2.0 µm, or in a conventional filter, or in a mixing and settling unit, resulting in a clear wort.

4. A process as claimed in claim 1, wherein said separating step is carried out continuously in a membrane filtration unit having a filter pore size not exceeding 2.0 µm, resulting in a clear wort.

5. A process as claimed in claim 2, wherein said separating step is carried out continuously in a membrane filtration unit having a filter pore size not exceeding 2.0 µm, resulting in a clear wort.

6. A process as claimed in claim 1, wherein said separating step is carried out in a membrane filtration unit having a filter pore size not exceeding 2.0 µm, resulting in a clear wort, said membrane filtration unit comprising at least three stages.

7. A process as claimed in claim 1, further comprising the step of boiling said provided wort after addition of hops.

8. A process as claimed in claim 7, wherein said provided wort is boiled with recovery of at least part of the heat.

9. A process as claimed in claim 8, wherein said recovered heat is used in one or more of said gelatinizing, liquefying, and converting steps.

10. A process as claimed in claim 7, further comprising the steps of cooling and fermenting said boiled wort to produce beer.

11. A process as claimed in claim 7, further comprising the steps of clarifying said boiled wort and thereafter cooling and fermenting said wort to produce beer.

12. A process as claimed in claim 1, wherein said column is a vertical column and wherein said central agitator shaft has at least 10 discs attached.

13. A process as claimed in claim 12, wherein said discs cover at least 80% of the cross section of the column.

14. A process as claimed in claim 13, wherein the cross section of the column covered by the discs does not exceed 95%.

15. A process as claimed in claim 12, wherein there is an absence of baffles in the column.

16. A process as claimed in claim 2, wherein said column used in said converting step is a vertical column and the central agitator shaft has at least 10 discs attached.

17. A process as claimed in claim 16, wherein said discs cover at least 80% of the cross section of the column.

18. A process as claimed in claim 17, wherein the cross section of the column covered by the discs does not exceed 95%.

19. A process as claimed in claim 16, wherein there is an absence of baffles in the column.

* * * * *

UNITED STATES PATENT AND TRADEMARK OFFICE
CERTIFICATE OF CORRECTION

PATENT NO. : 5,648,246
DATED : July 15, 1997
INVENTOR(S) : Christiaan Willem Versteegh It is certified that error appears in the above-identified patent and that said Letters Patent is hereby corrected as shown below:

On title page, item [62], after "5,536,650" insert --which is a national stage of PCT/NL92/00006, Jan. 10, 1992.--

Col. 3, line 3, "wort-filtration" should be --wort filtration--.

Col. 5, line 45, "FIG. 1" should be --FIG. 1,--.

Col. 6, line 9, "contractor" should be --contactor--.

Signed and Sealed this

First Day of December, 1998

Attest:

Attesting Officer

BRUCE LEHMAN
Commissioner of Patents and Trademarks